(12) United States Patent
Ortega et al.

(10) Patent No.: US 8,705,684 B2
(45) Date of Patent: Apr. 22, 2014

(54) RENEW PROCESS IMPLEMENTATION FOR REACTOR BOTTOM HEAD

(75) Inventors: Frank Ortega, San Jose, CA (US); Hsueh-Wen Na Pao, Saratoga, CA (US); Henry Peter Offer, Los Gatos, CA (US); Ahdee Quan Chan, Morgan Hill, CA (US)

(73) Assignee: General Electric Company, Schenectady, NY (US)

(*) Notice: Subject to any disclaimer, the term of this patent is extended or adjusted under 35 U.S.C. 154(b) by 1447 days.

(21) Appl. No.: 11/606,359

(22) Filed: Nov. 30, 2006

(65) Prior Publication Data
US 2008/0130819 A1 Jun. 5, 2008

(51) Int. Cl.
*G21C 17/00* (2006.01)
*G21C 13/02* (2006.01)
*G21C 13/00* (2006.01)

(52) U.S. Cl.
USPC ........... 376/305; 376/245; 376/249; 376/260; 376/277

(58) Field of Classification Search
USPC .................. 376/305, 260, 249, 245, 277, 306
See application file for complete search history.

(56) References Cited

U.S. PATENT DOCUMENTS

| | | | |
|---|---|---|---|
| 5,434,894 A * | 7/1995 | Chiang et al. | 376/203 |
| 5,530,219 A | 6/1996 | Offer et al. | |
| 5,544,208 A | 8/1996 | Pao et al. | |
| 6,137,853 A | 10/2000 | Duckering et al. | |
| 6,345,927 B1 | 2/2002 | Pao et al. | |
| 6,856,663 B2 | 2/2005 | Colditz et al. | |
| 6,856,664 B2 | 2/2005 | Pence et al. | |
| 7,076,017 B2 | 7/2006 | Offer et al. | |
| 2003/0156676 A1 * | 8/2003 | Colditz et al. | 376/260 |
| 2005/0265510 A1 * | 12/2005 | Jennings et al. | 376/260 |

FOREIGN PATENT DOCUMENTS

| | | |
|---|---|---|
| JP | 7-113896 | 5/1995 |
| JP | 2003-255077 | 9/2003 |
| JP | 2005-221384 | 8/2005 |
| JP | 2005-331245 | 12/2005 |
| WO | WO 94/16447 | 7/1994 |

OTHER PUBLICATIONS

Japanese Office Action dated Dec. 18, 2012 issued in Japanese Patent Application No. 2007-303923 and English translation, 7 pp.

* cited by examiner

*Primary Examiner* — Bernarr Gregory
(74) *Attorney, Agent, or Firm* — Nixon & Vanderhye P.C.

(57) ABSTRACT

A surface conditioning scheduling process is used to mitigate susceptibility to crack initiation or crack growth in a boiling water nuclear reactor using a plurality of working crews. A plurality of working zones are defined in an annulus region of a reactor vessel flange, and a plurality working zones are defined in a core region of the reactor vessel. One of the working crews is positioned in each of the annulus region working zones, and one of the working crews is positioned in each of the core region working zones. The working crews perform surface conditioning in areas of the reactor vessel accessible from their respective working zones such that the surface conditioning process can be completed in no more than thirty days.

13 Claims, 6 Drawing Sheets

Work Scope Allocation Logic – Breakdown

Site Mitigation – Critical Path Schedule

| TASK | CREW | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| Core Region | | ■ | ■ | ■ | ■ | ■ | ■ | ■ | ■ | ■ | ■ | ■ | ■ | ■ | ■ | ■ | ■ | ■ | ■ | ■ | ■ | | | | | | | | | | |
| Annulus Region | | | | | | | | | | | | | | | | | | | | | | | | | | | | | ■ | ■ | ■ |
| Stub tube 1 to 19 (periphery) | 1 | | | 360 degree platform | | | | | | | | | | | | | | | | | | | | | | | | | | | |
| CRDH 1 to 19 (periphery) | 1 | | | | | | | | | | | 360 degree platform | | | | | | | | | | | | | | | | | | | |
| H6 Top Quad (1 & 2) | 1 | | | | | | | | | | | | | | | | | | | 360 degree | | | | | | | | | | | |
| H6 Bottom Quad 1 | 1 | | | | | | | | | | | | | | | | | | | | | | 360 degree platform | | | | | | | | |
| Stub tube 20 to 38 (periphery) | 2 | | | 360 degree platform | | | | | | | | | | | | | | | | | | | | | | | | | | | |
| CRDH 20 to 38 (periphery) | 2 | | | | | | | | | | | | | 360 degree platform | | | | | | | | | | | | | | | | | |
| H6 Top Quad (3 & 4) | 2 | | | | | | | | | | | | | | | | | | | 360 degree | | | | | | | | | | | |
| H9 Bottom Quad 3 | 2 | | | | | | | | | | | | | | | | | | | | | | | 360 degree platform | | | | | | | |
| Stub tube 39 to 57 (periphery) | 3 | | | | | 360 degree platform | | | | | | | | | | | | | | | | | | | | | | | | | |
| CRDH 39 to 57 (periphery) | 3 | | | | | | | | | | | | | | | 360 degree platform | | | | | | | | | | | | | | | |
| H8 Bottom Quad 2 | 3 | | | | | | | | | | | | | | | | | | | | 360 degree platform | | | | | | | | | | |
| H9 Bottom Quad 2 | 3 | | | | | | | | | | | | | | | | | | | | | | | 360 degree platform | | | | | | | |
| Stub tube 58 to 76 (periphery) | 4 | | | | | 360 degree platform | | | | | | | | | | | | | | | | | | | | | | | | | |
| CRDH 58 to 76 (periphery) | 4 | | | | | | | | | | | | 360 degree platform | | | | | | | | | | | | | | | | | | |
| H8 Bottom Quad 4 | 4 | | | | | | | | | | | | | | | | | | | | 360 degree platform | | | | | | | | | | |
| H9 Bottom Quad 4 | 4 | | | | | | | | | | | | | | | | | | | | | | | 360 degree platform | | | | | | | |
| dP/SLC & ICMH 20-45 | 1 | | | | | | | | | | | | | | | | | | | | | | | | | | | | | | ■ |

Fig. 6

RENEW PROCESS IMPLEMENTATION FOR REACTOR BOTTOM HEAD

BACKGROUND OF THE INVENTION

The present invention relates to mitigating crack initiation or growth of small cracks in a nuclear reactor vessel and, more particularly, to an implementation/scheduling process for mechanical surface conditioning of metals to mitigate crack initiation or growth. Delivery of other processes to the component surfaces is also contemplated.

The welds in the bottom head region of a reactor vessel in a boiling water nuclear reactor are susceptible to cracking. Repair of such cracking requires complex and expensive processes. A known 'ReNew™ process' has been used to mitigate susceptibility to crack initiation or growth of small cracks due to tensile surface stresses, stress corrosion initiation and fatigue crack initiation using a mechanical surface conditioning of metals. These stresses can be found in the welds and heat affected zones of the reactor bottom head. The quantity of welds in the vessel head region, however, is very large, and it is typically very time consuming to mitigate all welds.

To the inventors' knowledge, mitigation of all bottom head welds in a reactor vessel has never been done. Prior methods have performed mitigation using water jet peening or laser shock peening.

For those reactors going through a shroud replacement process, bottom head weld mitigation is economically viable if mitigation can be performed in about thirty days or less. It would thus be desirable to provide a renew process implementation/scheduling process to mitigate all bottom head welds in a reactor vessel in an economically viable period of time.

BRIEF DESCRIPTION OF THE INVENTION

In an exemplary embodiment of the invention, a surface conditioning scheduling process is used to mitigate susceptibility to crack initiation or crack growth due to surface stresses in a boiling water nuclear reactor using a plurality of working crews. The process includes the steps of (a) defining a plurality of working zones in an annulus region of a reactor vessel flange; (b) positioning one of the working crews in each of the annulus region working zones; (c) defining a plurality working zones in a core region of the reactor vessel; (d) positioning one of the working crews in each of the core region working zones; and (e) the working crews performing surface conditioning in areas of the reactor vessel accessible from their respective working zones such that the surface conditioning process can be completed in no more than thirty days.

In another exemplary embodiment of the invention, the process includes the steps of assembling a circular platform on a reactor vessel flange; assembling an auxiliary bridge; positioning a first plurality of working crews on the circular platform adjacent a corresponding first plurality of working zones in an annulus region of a reactor vessel flange; positioning a second plurality of working crews on a reactor main bridge adjacent a second plurality of working zones in a core region of the reactor vessel; positioning a third plurality of working crews on the auxiliary bridge adjacent a third plurality of working zones in the core region of the reactor vessel; and the working crews performing surface conditioning in areas of the reactor vessel accessible from at least one of the circular platform, the main bridge, and the auxiliary bridge.

In yet another exemplary embodiment of the invention, the component surface treatment scheduling process is utilized for delivering other treatment processes to the reactor component surfaces.

BRIEF DESCRIPTION OF THE DRAWINGS

FIG. 6 is a critical path schedule for the working crews in the annulus region.

DETAILED DESCRIPTION OF THE INVENTION

A ReNew™ process is a process for mechanical conditioning of metals to mitigate susceptibility to crack initiation or growth of small cracks due to tensile surface stresses, stress corrosion initiation cracking and fatigue crack initiation. These stresses can be found in the welds and heat affected zones of a reactor bottom head. The scheduling process described herein allows the ReNew™ process to be implemented in the welds at the bottom head in no more than thirty days. In a preferred implementation, the scheduling process described herein relates to reactors that are having the reactor internals replaced, where all reactor internal components located between the top of the vessel flange and the top of a control rod drive housing have been removed. Additionally, the shroud above the shroud support has been removed as well as all jet pumps and jet pump components.

Figure 1:
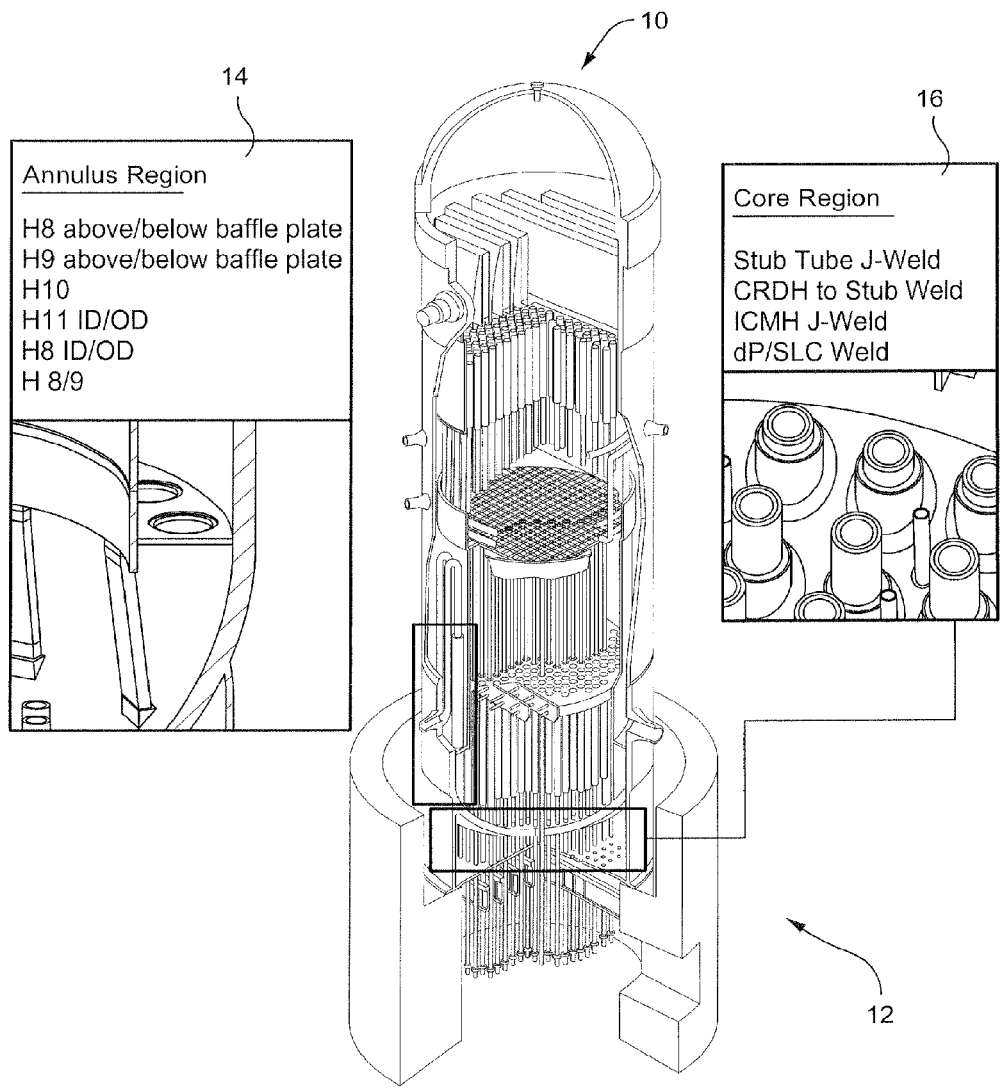
FIG. 1 is a sectional view of a nuclear reactor vessel showing generally locations of an annulus region and a core region.
Figure 3:
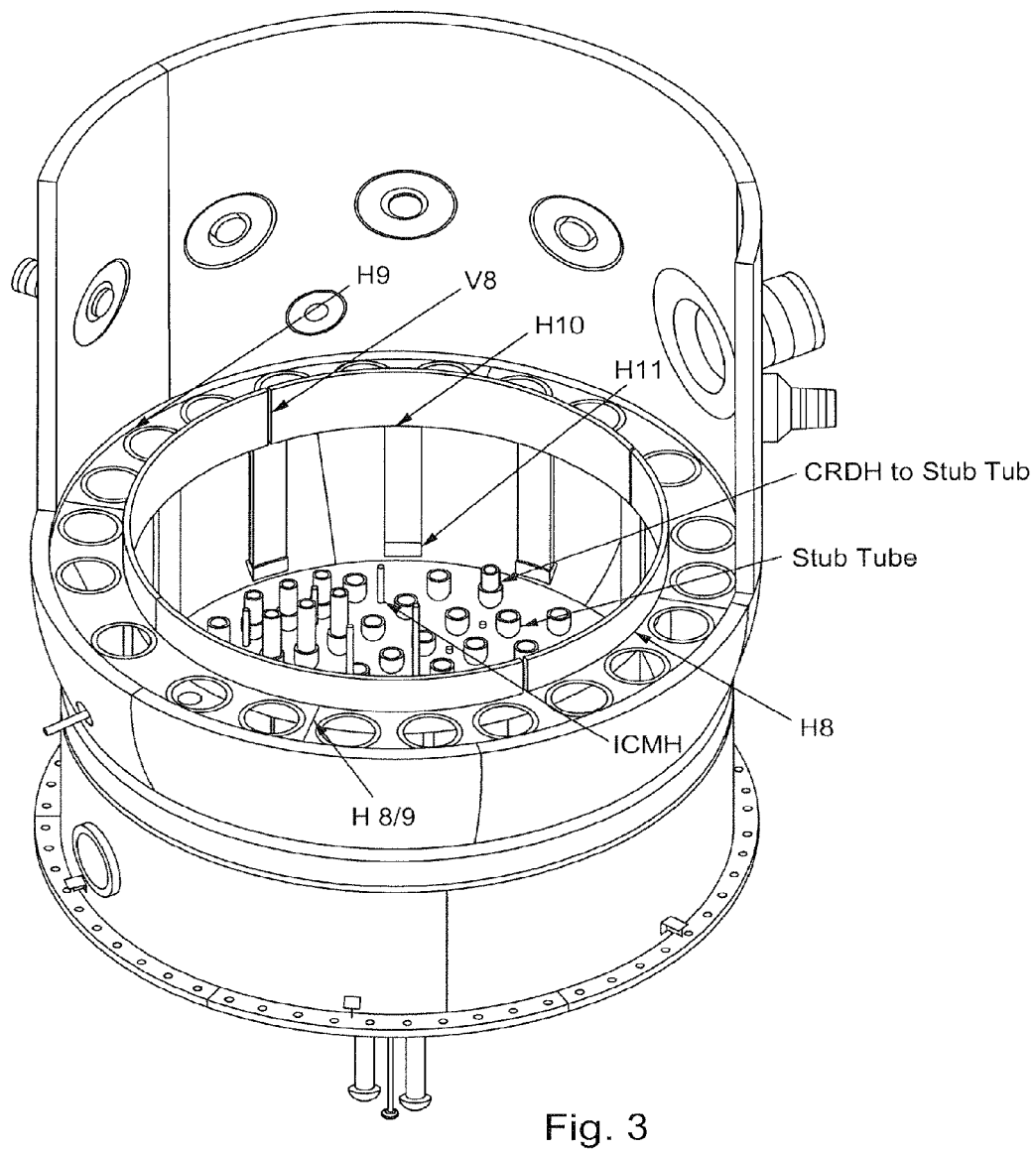
FIG. 3 shows the various working zones in each of the annulus region and the core region.

With reference to FIGS. 1 and 3, a bottom head 12 of a reactor vessel 10 can be separated into an annulus region 14 and a core region 16. Each region 14, 16 can be further divided into reactor zones or welding zones including a first area zone (designated as H8), a second area zone (designated as H9), a first leg zone (designated as H10), a second leg zone (designated as H11), a vert zone (designated as V8), and a combination zone (designated as H8/9). The core region 16 includes reactor zones as stub tube zones, CRDH zones, ICMH zones, and dP/SLC zones.

Figure 2:
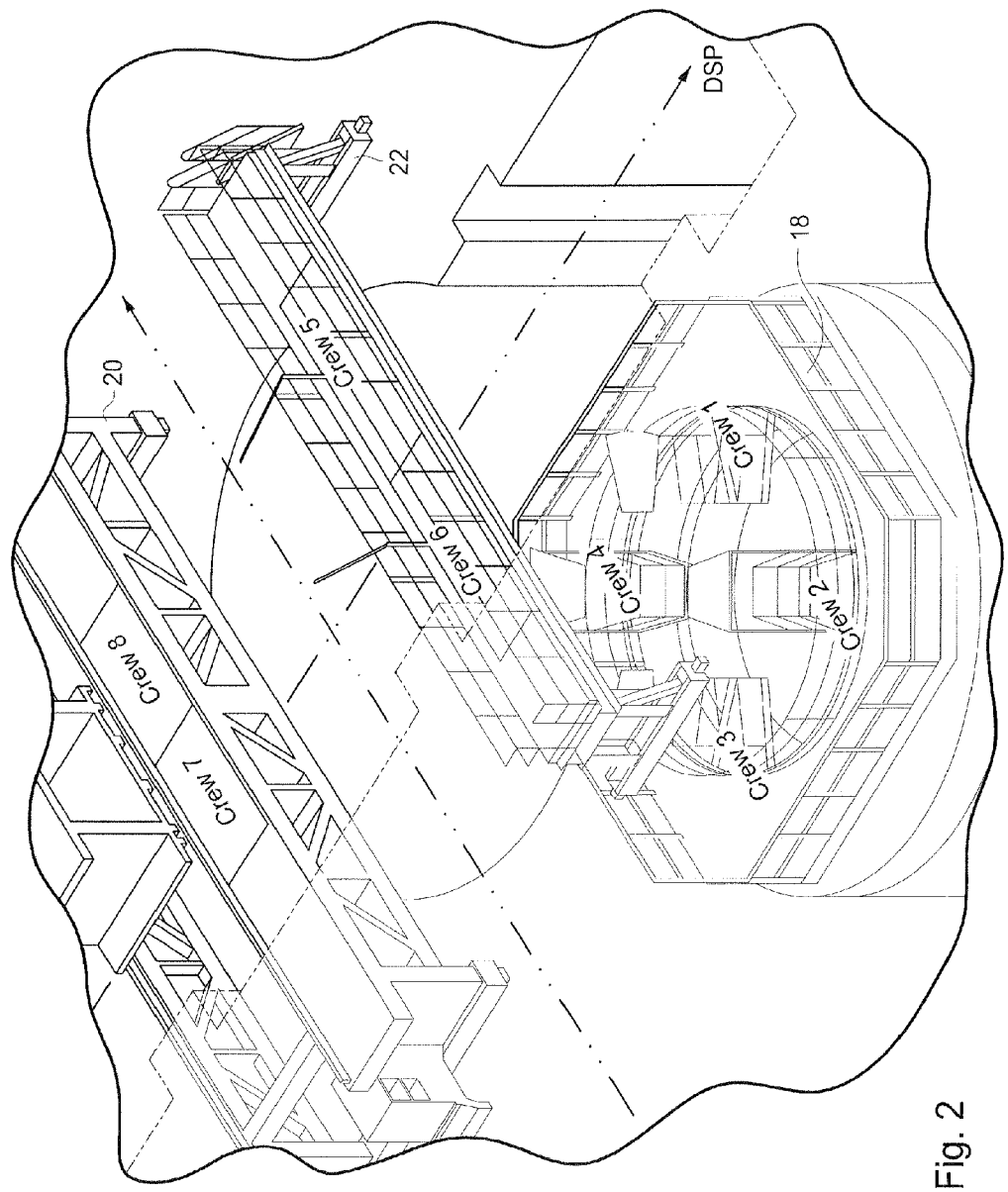
FIG. 2 illustrates preferred work areas of each of the working crews.
Figure 5:
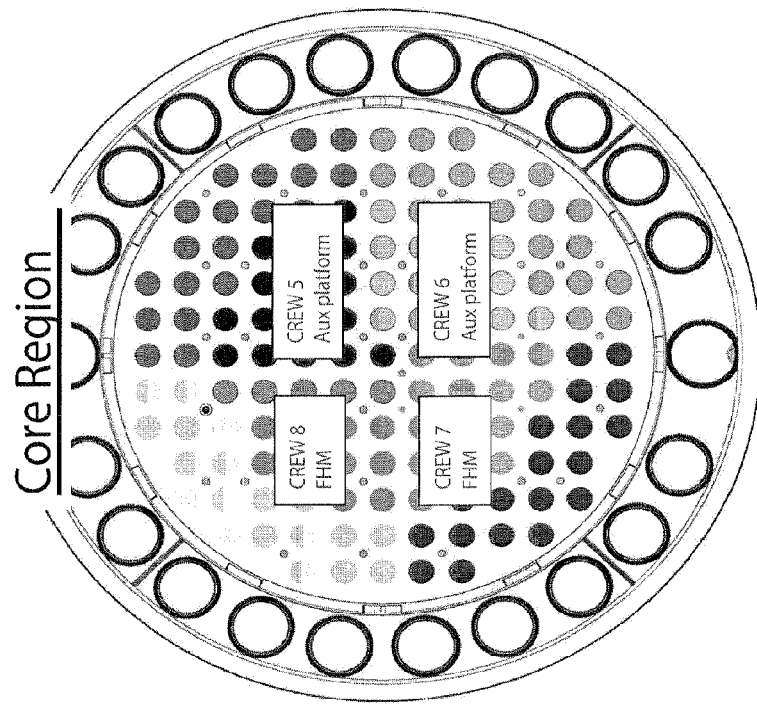
FIG. 5 shows the working crew positions for the core region.
Figure 4:
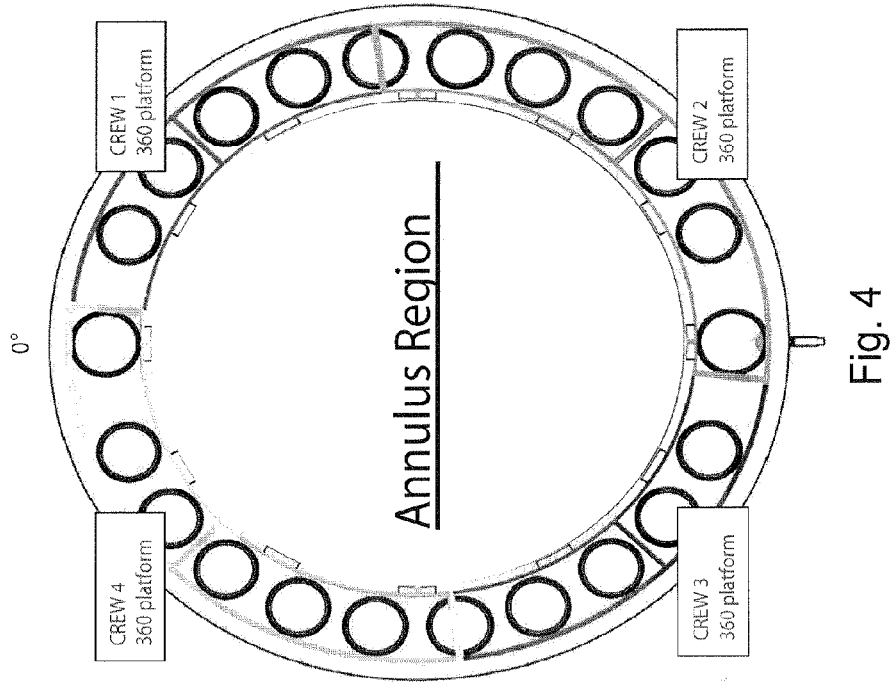
FIG. 4 shows the working crew positions for the annulus region.

In a preferred arrangement, the scheduling process utilizes eight working crews. Each region 14, 16 includes a plurality of working zones, one each for each working crew. With reference to FIGS. 2, 4 and 5, prior to positioning the working crews, a circular platform 18 is assembled on the reactor vessel flange. As shown, crews 1-4 are positioned in the annulus region working zones on the circular platform 18.

The reactor vessel 10 is typically provided with a main bridge 20 for various refueling and maintenance activities. In the scheduling process described herein, an auxiliary bridge 22 is assembled that extends between the sides of the vessel cavity. As shown in FIG. 2, crews 5 and 6 are positioned on the auxiliary bridge, and crews 7 and 8 are positioned on the main bridge 20.

Figure 7:
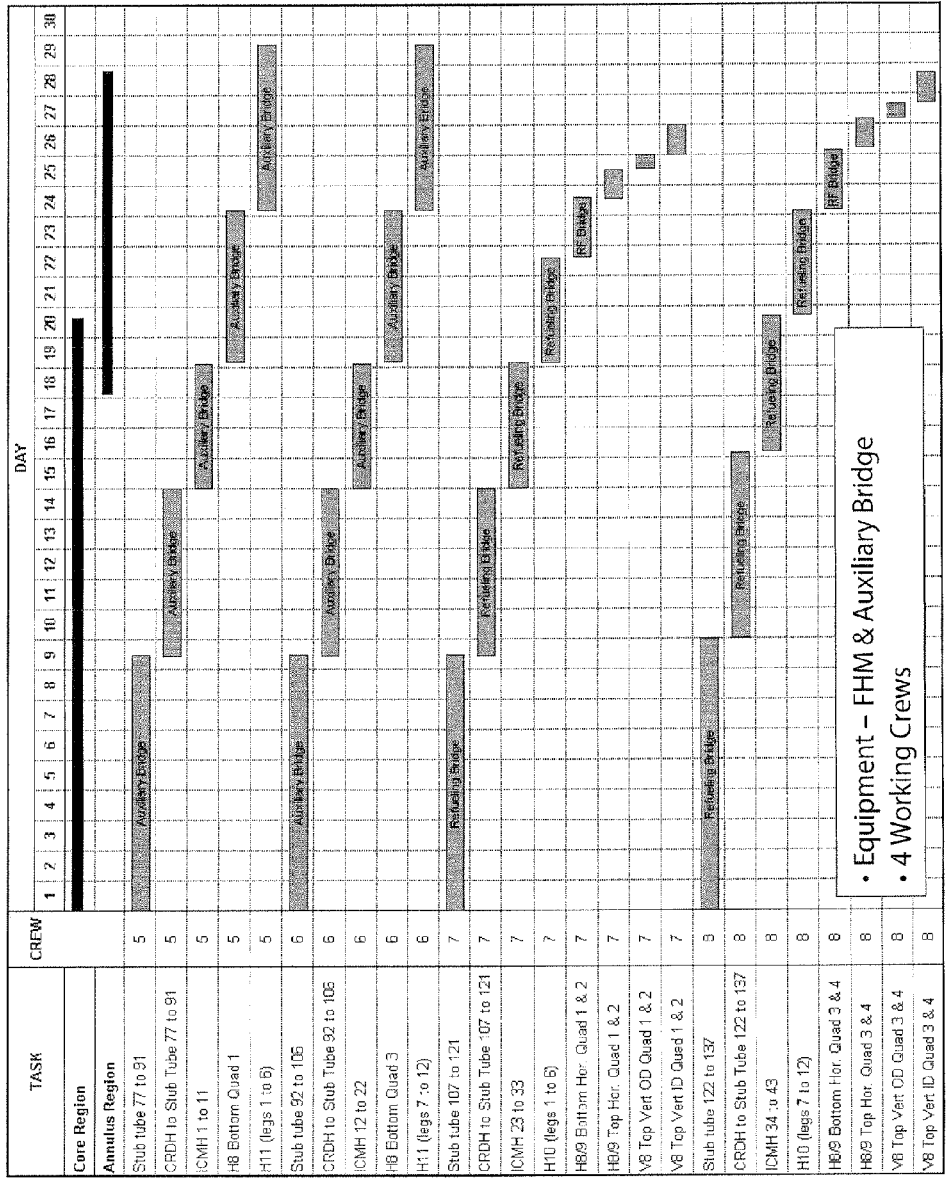
FIG. 7 is a critical path schedule for the working crews in the core region.

The appropriately positioned working crews perform surface conditioning in areas of the reactor vessel accessible from their respective working zones. FIGS. 6 and 7 illustrate an exemplary critical path schedule for each of the crews including the reactor zone for which each crew is responsible and a time goal for completing the conditioning process in each assigned reactor zone. From the crew assignments in the exemplary critical path schedule shown in FIGS. 6 and 7, it is clear that each crew has access to reactor zones in both the annulus region 14 and the core region 16 from their respective working zones. With the defined reactor zones and noted working crew responsibilities, mitigation of all bottom head welds can be performed in less than thirty days.

Although the methods described herein have been directed to an application of surface conditioning for mitigating crack initiation or growth of small cracks. The disclosed application tooling, service platforms/bridges, and multiple crew arrangements are also suitable for delivery of other processes to the component surfaces (e.g. GE's ReNew™ Surface Improvement). These other processes may include welding, coating, inspection, thermal treatment, excavation, etc. The invention is thus not necessarily meant to be limited to the disclosed application.

With the surface conditioning scheduling process described herein, a ReNew™ process for mitigating susceptibility to crack initiation or growth of small cracks (and other processes) can be performed for all bottom head welds in a reactor vessel in an economically viable time period.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A surface conditioning scheduling process to mitigate susceptibility to crack initiation or crack growth in a boiling water nuclear reactor or pressurized water nuclear reactor using a plurality of working crews, the process comprising:
   (a) defining a plurality of working zones in an annulus region of a reactor vessel flange;
   (b) assembling a circular platform on the reactor vessel flange such that the circular platform is supported on the reactor vessel flange and extends radially inward from the reactor vessel flange toward a central axis of the reactor vessel, the annulus region working zones residing on the circular platform at a level above the reactor vessel flange;
   (c) positioning one of the working crews in each of the annulus region working zones;
   (d) defining a plurality working zones in a core region of the reactor vessel;
   (e) positioning one of the working crews in each of the core region working zones; and
   (f) the working crews performing surface conditioning in areas of the reactor vessel accessible from their respective working zones such that the surface conditioning process can be completed in no more than thirty days.

2. A process according to claim 1, using at least eight working crews, wherein step (a) is practiced by defining at least four annulus region working zones, and wherein step (d) is practiced by defining at least four core region working zones.

3. A process according to claim 1, wherein the boiling water nuclear reactor includes a main bridge providing access to at least a first part of core region, the process further comprising, prior to step (e) assembling an auxiliary bridge adjacent a second part of the core region, each of the core region working zones residing on at least one of the main bridge and the auxiliary bridge.

4. A process according to claim 1, further comprising defining annulus region reactor zones including first area zones, second area zones, first leg zones, second leg zones, vert zones, and combination zones.

5. A process according to claim 4, further comprising defining core region reactor zones including stub tube zones, CRDH zones, ICMH zones, and dP/SLC zones.

6. A process according to claim 5, wherein each of the working crews in the annulus region working zones performs surface conditioning on one of the stub tube zones, the CRDH zones, the first area zones, and the second area zones.

7. A process according to claim 6, wherein at least one of the annulus region working crews additionally performs surface conditioning on a dP/SLC zone and an ICMH zone.

8. A process according to claim 7, wherein each of the working crews in the core region working zones performs surface conditioning on one of the stub tube zones, the CRDH zones, and the ICMH zones.

9. A process according to claim 8, wherein at least one of the core region working crews additionally performs surface conditioning in at least one of the first area zones, the second area zones, the first leg zones, the second leg zones, and the vert zones.

10. A surface conditioning scheduling process to mitigate susceptibility to crack initiation or crack growth due to tensile surface stresses in a boiling water nuclear reactor or pressurized water nuclear reactor using a plurality of working crews, the process comprising:
    assembling a circular platform on a reactor vessel flange such that the circular platform is supported on the reactor vessel flange and extends radially inward from the reactor vessel flange toward a central axis of the reactor vessel;
    assembling an auxiliary bridge;
    positioning a first plurality of working crews on the circular platform adjacent a corresponding first plurality of working zones in an annulus region of the reactor vessel flange at a level above the reactor vessel flange;
    positioning a second plurality of working crews on a reactor main bridge adjacent a second plurality of working zones in a core region of the reactor vessel;
    positioning a third plurality of working crews on the auxiliary bridge adjacent a third plurality of working zones in the core region of the reactor vessel; and
    the working crews performing surface conditioning in areas of the reactor vessel accessible from at least one of the circular platform, the main bridge, and the auxiliary bridge.

11. A process according to claim 10, using eight working crews, wherein the first plurality of working crews comprises four working crews, wherein the second plurality of working crews comprises two working crews, and wherein the third plurality of working crews comprises two working crews.

12. A component surface treatment scheduling process for delivering treatment processes to component surfaces in a boiling water nuclear reactor or pressurized water nuclear reactor using a plurality of working crews, the process comprising:
    assembling a circular platform on a reactor vessel flange such that the circular platform is supported on the reactor vessel flange and extends radially inward from the reactor vessel flange toward a central axis of the reactor vessel;
    assembling an auxiliary bridge;
    positioning a first plurality of working crews on the circular platform adjacent a corresponding first plurality of working zones in an annulus region of the reactor vessel flange at a level above the reactor vessel flange;

positioning a second plurality of working crews on a reactor main bridge adjacent a second plurality of working zones in a core region of the reactor vessel;

positioning a third plurality of working crews on the auxiliary bridge adjacent a third plurality of working zones in the core region of the reactor vessel; and the working crews performing treatment processes on component surfaces in areas of the reactor vessel accessible from at least one of the circular platform, the main bridge, and the auxiliary bridge.

13. A process according to claim 12, wherein the treatment processes include welding, coating, inspection, thermal treatment, and excavation.

* * * * *